US008429192B2

(12) United States Patent
Burnett et al.

(10) Patent No.: US 8,429,192 B2
(45) Date of Patent: Apr. 23, 2013

(54) SYSTEM AND METHOD FOR SUPPORTING A PLURALITY OF ACCESS CONTROL LIST TYPES FOR A FILE SYSTEM IN AN OPERATING SYSTEM

(75) Inventors: Rodney Carlton Burnett, Austin, TX (US); Ramanjaneya Sarma Burugula, Croton on Hudson, NY (US); Niteesh K. Dubey, Yorktown Heights, NY (US); Joefon Jann, Ossining, NY (US); Ravi A. Shankar, Austin, TX (US); Wu Zheng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 11/002,865

(22) Filed: Dec. 2, 2004

(65) Prior Publication Data

US 2006/0123005 A1 Jun. 8, 2006

(51) Int. Cl.
*G06F 7/00* (2006.01)
*G06F 17/30* (2006.01)

(52) U.S. Cl.
USPC .......................................... 707/785; 707/705

(58) Field of Classification Search .............. 707/9, 705, 707/785
See application file for complete search history.

(56) References Cited

U.S. PATENT DOCUMENTS

| | | | | |
|---|---|---|---|---|
| 5,948,110 A * | 9/1999 | Hitz et al. | ......................... | 714/6 |
| 5,968,135 A * | 10/1999 | Teramoto et al. | ............. | 713/375 |
| 6,119,151 A * | 9/2000 | Cantrell et al. | ................ | 709/216 |
| 6,163,844 A * | 12/2000 | Duncan et al. | ..................... | 726/3 |
| 6,519,647 B1 * | 2/2003 | Howard et al. | ............... | 709/229 |
| 6,549,916 B1 * | 4/2003 | Sedlar | ............................ | 707/200 |
| 6,625,603 B1 * | 9/2003 | Garg et al. | ......................... | 707/9 |
| 6,651,096 B1 * | 11/2003 | Gai et al. | ......................... | 709/223 |
| 7,290,144 B1 * | 10/2007 | Kitaj et al. | ..................... | 713/182 |
| 2002/0010861 A1 * | 1/2002 | Matsuyama et al. | .......... | 713/182 |
| 2002/0124053 A1 * | 9/2002 | Adams et al. | ................. | 709/216 |
| 2003/0055991 A1 * | 3/2003 | Krishnapuram et al. | ..... | 709/229 |
| 2003/0105970 A1 * | 6/2003 | Pei Jen | ........................... | 713/200 |
| 2003/0187846 A1 * | 10/2003 | Bangel et al. | ..................... | 707/9 |
| 2006/0092947 A1 * | 5/2006 | O'Keeffe et al. | ......... | 370/395.31 |

OTHER PUBLICATIONS

Tatyana Ryutov and Clifford Neuman, "Representation and Evaluation of Security Policies for Distributed System Services", Jan. 2000, IEEE, pp. 172-183.*

(Continued)

*Primary Examiner* — Apu Mofiz
*Assistant Examiner* — Jared Bibbee
(74) *Attorney, Agent, or Firm* — Mitch Harris, Atty at Law, LLC; Andrew M. Harris; Matthew W. Baca

(57) ABSTRACT

System, method and computer program product for supporting a plurality of Access Control List types for a file system in an operating system in a data processing system. An Access Control List supporting system for managing access to a file system in a data processing system has at least one file system in an operating system of the data processing system, and an Access Control List management framework in the operating system and external to the at least one file system for managing access to the at least one file system. The Access Control List supporting system of the invention removes ACL management and access check-related functions from the at least one file system to an external Access Control List management framework, thus enabling an operating system to support a plurality of Access Control List types using the same Access Control List management framework and enabling new Access Control List types to be added to the operating system dynamically while the operating system is running.

18 Claims, 2 Drawing Sheets

OTHER PUBLICATIONS

IBM Technical Disclosure Bulletin, v36, n3, Mar. 1993, p. 329-332, Luniewski, "Efficient Implementation of ACLS for Object-Oriented Systems", abstract.

U.S. Appl. No. 10/687,258, filed Oct. 16, 2003, Haugh et al., Method, Apparatus, and Program for Multiple Simultaneous ACL Formats on a Filesystem.

* cited by examiner

SYSTEM AND METHOD FOR SUPPORTING A PLURALITY OF ACCESS CONTROL LIST TYPES FOR A FILE SYSTEM IN AN OPERATING SYSTEM

BACKGROUND OF THE INVENTION

1. Technical Field

The present invention relates generally to access control in an operating system in a data processing system and, more particularly, to a system, method and computer program product for supporting a plurality of Access Control List types for a file system in an operating system.

2. Description of Related Art

An Access Control List (ACL) is used as a mechanism for determining the appropriate access rights to a given object. The ACL is a data structure, typically a table, containing entries that specify the rights of an individual or group to access specific system objects such as a program, a process or a file. Each accessible object contains an identifier to its ACL. The privileges or permissions determine specific access rights, such as whether a user can read from, write to or execute an object.

The ACL is a concept with several different implementations in various operating systems. Current operating systems support only one ACL type per file system instance or use a different mechanism for each ACL type. In an operating system that has multiple file systems supporting the same ACL type, each file system must have code to handle the ACL type on an individual basis.

NFS V4 is being adopted by most of the leading operating system providers to be the industry-wide standard protocol for network file sharing. As indicated above, an operating system typically supports only one ACL type. If it is desired to add one or more additional ACL types to an operating system, it is usually necessary to create a different mechanism to handle each additional ACL type.

It would, accordingly, be desirable to provide a system wide framework and method for supporting a plurality of ACL types for a file system in an operating system that requires only a single framework to handle the different ACL types.

SUMMARY OF THE INVENTION

The present invention provides a system, method and computer program product for supporting a plurality of Access Control List types for a file system in an operating system in a data processing system. An Access Control List supporting system for managing access to a file system in a data processing system has at least one file system in an operating system of the data processing system, and an Access Control List management framework in the operating system and external to the at least one file system for managing access to the at least one file system. The Access Control List supporting system of the invention removes ACL management and access check-related functions from the at least one file system to the external Access Control List management framework, thus enabling an operating system to support a plurality of Access Control List types using the same Access Control List management framework and enabling new Access Control List types to be added to the operating system dynamically while the operating system is running.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
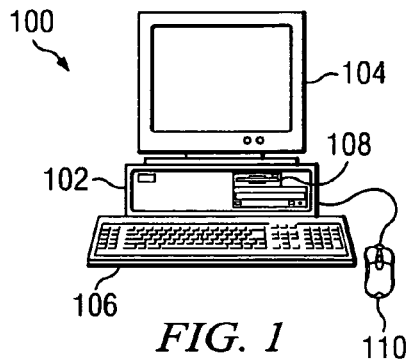
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
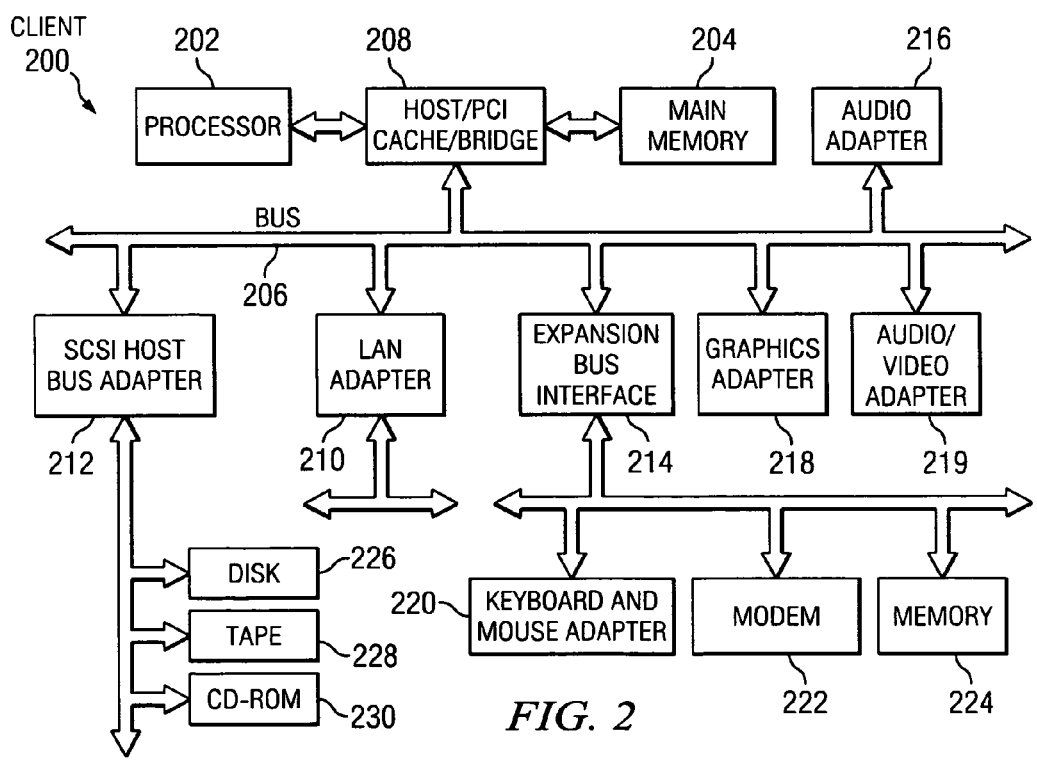
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
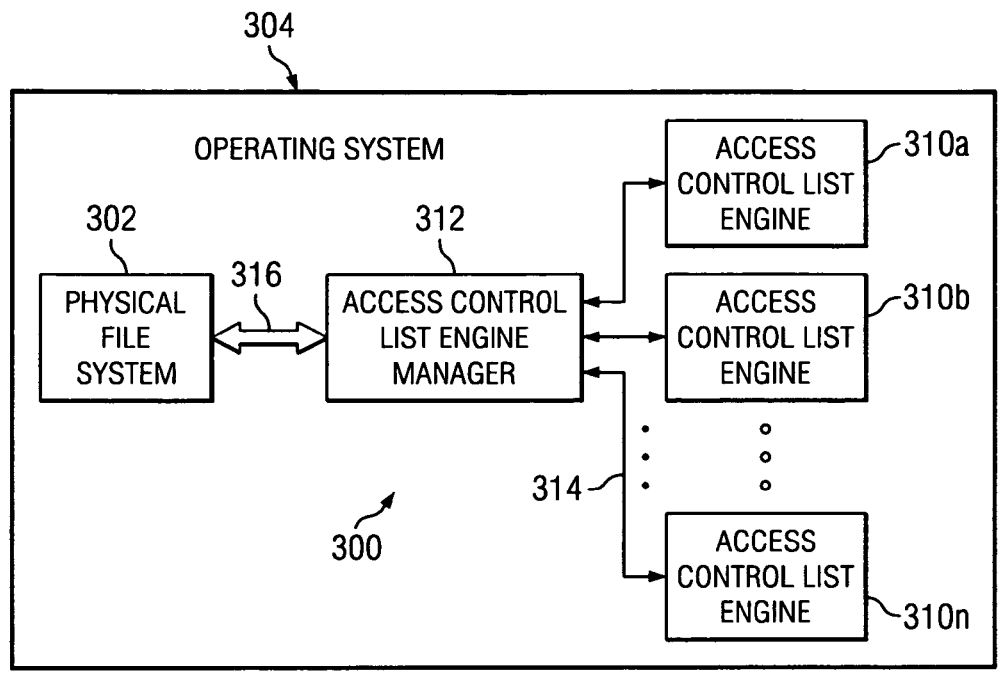
FIG. 3 is a block diagram that schematically illustrates an Access Control List management framework for managing access to a file system in an operating system in a data processing system in accordance with a preferred embodiment of the present invention.

FIG. 3 is a block diagram that schematically illustrates an Access Control List management framework for managing access to a file system in an operating system in a data processing system in accordance with a preferred embodiment of the present invention. The Access Control List (ACL) management framework is generally designated by reference number 300, and is provided to manage access to files maintained in physical file system 302. ACL management framework 300 and physical file system 302 are incorporated in an operating system 304 which may be implemented as an operating system running on processor 202 in data processing system 200 illustrated in FIG. 2. Although only one file system is illustrated in FIG. 3, it should be understood that operating system 304 may contain a plurality of file systems, if desired.

An ACL is a data structure containing entries that specify the rights of an individual or group to access specific objects such as a file stored in physical file system 302. Each accessible file in physical file system 302 contains an identifier to its ACL, and the privileges or permissions determine specific access rights, such as whether a user can read from or write to a file.

Although there are several different implementations or types of ACLs, current operating systems support only one ACL type per file system or support a plurality of ACL types by using a different mechanism to support each ACL type. If it is desired to add additional ACL types to an operating system, a different mechanism must be provided to handle each additional ACL type.

The present invention provides a system and method for supporting a plurality of ACL types for a file system in an operating system in a data processing system that requires only a single framework to handle the different ACL types.

Referring back to FIG. 3, ACL management framework 300 includes a plurality of ACL engines 310a, 310b, ... 310n, each of which is specific to and supports a different ACL type. In particular, each ACL engine 310a, 310b, ... 310n, performs ACL management functions (ACL set and ACL get) that are specific to a particular ACL type.

ACL management framework 300 also includes ACL engine manager 312. ACL engine manager interfaces with each of the plurality of ACL engines 310a, 310b, ... 310n, as illustrated at 314, and with physical file system 302 as indicated at 316. ACL engine manager 312 handles overall management and access check-related functions that are conventionally handled by physical file system 302. In particular, when access to a file in physical file system 302 is sought by an individual or a group, the physical file system will contact the appropriate one of the plurality of ACL engines 310a, 310b, ... 310n, through ACL engine manager 312, which will then perform access checks using a generic set of access-check operation codes. In other words, with the present invention, ACL engine manager 312 performs all management, individual ACL engines 310a, 310b, ... 310n, perform the access checks, while the physical file system uses a generic set of access-check operation codes. With the present invention, accordingly, physical file system 302 is freed of ACL management and access check-related functions that are handled by ACL engine manager 312 and ACL engines 310a, 310b, ... 310n; and, as a result, physical file system 302 can provide support for multiple ACL types and enforce access validations for any ACL type at the various file access code points (such as open, read, write, etc.) uniformly without being concerned about ACL type-specific access checks.

In general, the present invention provides a framework for centralizing ACL implementation externally of the physical file system thus enabling uniform access control enforcement for one or more physical file systems in an operating system, and better service and support of a centralized code.

ACL management franework 300 can support any desired number of different ACL types. In addition, new ACL types can be easily added to the operating system dynamically using ACL management framework 300 to handle all the different types. In particular, ACL management framework 300 enables additional ACL types to be registered and started for a file system while the operating system is running and without the need of a reboot.

Figure 4:
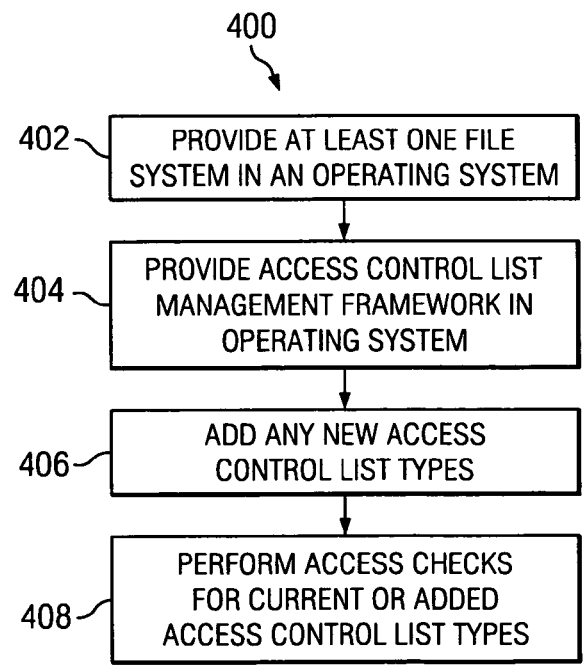
FIG. 4 is a flowchart that illustrates a method for supporting a plurality of Access Control List types for a file system in an operating system in a data processing system in accordance with a preferred embodiment of the present invention.

FIG. 4 is a flowchart that illustrates a method for supporting a plurality of Access Control List types for a file system in an operating system in a data processing system in accordance with a preferred embodiment of the present invention. The method is generally designated by reference number 400, and begins by providing at least one physical file system in an operating system of a data processing system (Step 402). An ACL management framework that supports a plurality of ACL types is also provided in the operating system external of the at least one physical file system to for managing access to the at least one file system (Step 404). The ACL management framework performs ACL management functions (ACL set and ACL get) that are specific to particular ACL types, and handles overall management and access check-related functions that are conventionally handled by the at least one physical file system. Any new ACL types are added to the operating system (Step 406), and the physical file system of the operating system then performs access checks for current or any added ACL types using the same generic set of access-check operation codes irrespective of ACL type (Step 408). The new ACL types are added to the operating system while the operating system is running and without having to reboot.

The present invention thus provides a system, method and computer program product for supporting a plurality of Access Control List types for a file system in an operating system in a data processing system. An Access Control List supporting system for managing access to a file system in a data processing system has at least one file system in an operating system of the data processing system, and an Access Control List management framework in the operating system and external to the at least one file system for managing access to the at least one file system. The Access Control List supporting system of the invention removes ACL management and access check-related functions from the at least one file system to the external Access Control List management framework, thus enabling an operating system to support a plurality of Access Control List types using the same Access Control List management framework and enabling new Access Control List types to be added to the operating system dynamically while the operating system is running.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing file access in a computer system, the method comprising:

receiving, by a file system within an operating system image executing within the computer system, an access request for accessing a file stored within the computer system and accessible by the file system;

responsive to receiving the access request, transmitting, from the file system to an access control management framework external to the file system and within the operating system image, an access check request for causing the access control management framework to perform an access check operation, wherein the transmitting transmits, within the operating system image, a generic access check operation code to the access control management framework;

responsive to the transmitting, receiving the access check request at the access control management framework;

responsive to receiving the access check request at the access control management framework, performing an access check operation within the operating system image as specified by the generic access check operation code using one of multiple access control list engines within the operating system image and external to the file system, wherein the one of the multiple access control list engines is selected in conformity with a type of access control list entry appropriate for the file as accessible by the file system, wherein the multiple access control list engines correspond to different types of access control list entry types; and returning a result of the access request to the file system, wherein the file system responds to the access request in conformity with a result of the access check performed by the one of the multiple access control list engines.

2. The method of claim 1, further comprising expanding types of access control lists supported by the access control management framework by registering a new access control list engine as one of the multiple access control list engines.

3. The method of claim 2, wherein the registering is performed without requiring a re-start of the file system, whereby the types of access control lists supported by the access control lists supported by the access control management framework is expanded dynamically during operation of the computer system.

4. The method of claim 1, wherein the receiving receives a request to set an access control list entry associated with the file, and wherein the transmitting transmits a generic set request to the access control management framework.

5. The method of claim 1, wherein the receiving receives a request to get an access control list entry associated with the file, and wherein the transmitting transmits a generic set request to the access control management framework.

6. The method of claim 1, wherein the computer system supports multiple file systems, and wherein the access control management framework receives a same set of generic access check operation codes for each of the multiple file systems, whereby the access control management framework supports access to the multiple file systems in a uniform manner.

7. A computer system including a processor for executing program instructions coupled to a memory for storing the program instructions, wherein the program instructions are instructions forming a portion of an operating system for managing file access in the computer system, wherein the program instructions comprise program instructions for:

receiving, by a file system within an image of the operating system executing within the computer system, an access request for accessing a file stored within the computer system and accessible by the file system;

responsive to receiving the access request, transmitting, from the file system to an access control management framework external to the file system and within the operating system image, an access check request for causing the access control management framework to perform an access check operation, wherein the transmitting transmits, within the operating system image, a generic access check operation code to the access control management framework;

responsive to the transmitting, receiving the access check request at the access control management framework;

responsive to receiving the access check request at the access control management framework, performing an access check operation within the operating system image as specified by the generic access check operation code using one of multiple access control list engines within the operating system image and external to the file system, wherein the one of the multiple access control list engines is selected in conformity with a type of access control list entry appropriate for the file as accessible by the file system, wherein the multiple access control list engines correspond to different types of access control list entry types; and returning a result of the access request to the file system, wherein the file system responds to the access request in conformity with a result of the access check performed by the one of the multiple access control list engines.

8. The computer system of claim 7, further comprising program instructions for registering a new access control list engine as one of the multiple access control list engines, whereby types of access control lists supported by the access control management framework are expanded.

9. The computer system of claim 8, wherein the program instructions for registering complete the registration without requiring a re-start of the file system, whereby the types of access control lists supported by the access control lists supported by the access control management framework is expanded dynamically during operation of the computer system.

10. The computer system of claim 7, wherein the program instructions for receiving receive a request to set an access control list entry associated with the file, and wherein the program instructions for transmitting transmit a generic set request to the access control management framework.

11. The computer system of claim 7, wherein the receiving receives a request to get an access control list entry associated with the file, wherein the program instructions for transmitting transmit a generic set request to the access control management framework.

12. The computer system of claim 7, wherein the computer system supports multiple file systems, and wherein the access control management framework receives a same set of generic access check operation codes for each of the multiple file systems, whereby the access control management framework supports access to the multiple file systems in a uniform manner.

13. A computer program product comprising a computer-readable storage medium comprising program instructions forming a portion of an operating system, wherein the program instructions are for managing file access in the computer system, wherein the program instructions comprise program instructions for:

receiving, by a file system within an image of the operating system executing within the computer system, an access request for accessing a file stored within the computer system and accessible by the file system;

responsive to receiving the access request, transmitting, from the file system to an access control management framework external to the file system and within the operating system image, an access check request for causing the access control management framework to perform an access check operation, wherein the transmitting transmits, within the operating system image, a generic access check operation code to the access control management framework;

responsive to the transmitting, receiving the access check request at the access control management framework;

responsive to receiving the access check request at the access control management framework, performing an access check operation within the operating system image as specified by the generic access check operation code using one of multiple access control list engines within the operating system image and external to the file system, wherein the one of the multiple access control list engines is selected in conformity with a type of access control list entry appropriate for the file as accessible by the file system, wherein the multiple access control list engines correspond to different types of access control list entry types; and returning a result of the access request to the file system, wherein the file system responds to the access request in conformity with a result of the access check performed by the one of the multiple access control list engines.

14. The computer program product of claim 13, further comprising program instructions for registering a new access control list engine as one of the multiple access control list engines, whereby types of access control lists supported by the access control management framework are expanded.

15. The computer program product of claim 14, wherein the program instructions for registering complete the registration without requiring a re-start of the file system, whereby the types of access control lists supported by the access control lists supported by the access control management framework is expanded dynamically during operation of the computer system.

16. The computer program product of claim 13, wherein the program instructions for receiving receive a request to set an access control list entry associated with the file, and wherein the program instructions for transmitting transmit a generic set request to the access control management framework.

17. The computer program product of claim 13, wherein the receiving receives a request to get an access control list entry associated with the file, wherein the program instructions for transmitting transmit a generic set request to the access control management framework.

18. The computer program product of claim 13, wherein the computer system supports multiple file systems, and wherein the access control management framework receives a same set of generic access check operation codes for each of the multiple file systems, whereby the access control management framework supports access to the multiple file systems in a uniform manner.

* * * * *